Jan. 24, 1967     P. L. PEUBE     3,299,712

DIFFERENTIAL PRESSURE GAUGE DEVICE

Filed June 29, 1964     2 Sheets-Sheet 1

3,299,712
DIFFERENTIAL PRESSURE GAUGE DEVICE
Jean L. Peube, 6 Villa Desire Filleaud, Clamart, France
Filed June 29, 1964, Ser. No. 378,543
Claims priority, application France, July 8, 1963,
Patent 1,362,334
9 Claims. (Cl. 73—401)

This invention relates to a pressure gauge device capable of indicating extremely small pressure differentials in an accurate and reproducible manner.

Conventional instruments of this kind usually rely on the position of a meniscus at the interface between a liquid and vapour as an indication of the pressure differential to be measured. The precision of such instruments is seriously limited because of surface tension and other unwanted secondary effects affecting the shape and position of the meniscus. It is an object of this invention to provide a highly sensitive and faithful pressure indicating instrument which will be free from such prior limitations inherent to the use of a meniscus as the measuring element. An object is to provide a differential manometer or pressure gauge which will operate on an optical, interferometric principle and will take advantage of the extremely high degrees of precision of which interferometric methods are susceptible.

A differential pressure indicating device according to the invention in an important aspect thereof comprises a container for a body of liquid, an element in the container having a surface defining a film of variable thickness with an adjacent free surface of the liquid, means creating a set of interference (or Newton) fringes in said film, means communicating a variable pressure to a free surface of the liquid whereby variations in said pressure will vary the thickness of said film and cause a resulting displacement of said fringes, and means for indicating fringe displacement as a measure of a variation in said pressure.

Exemplary embodiments of the invention will now be described for purposes of illustration but not of limitation with reference to the accompanying drawings, wherein.

Figure 1:
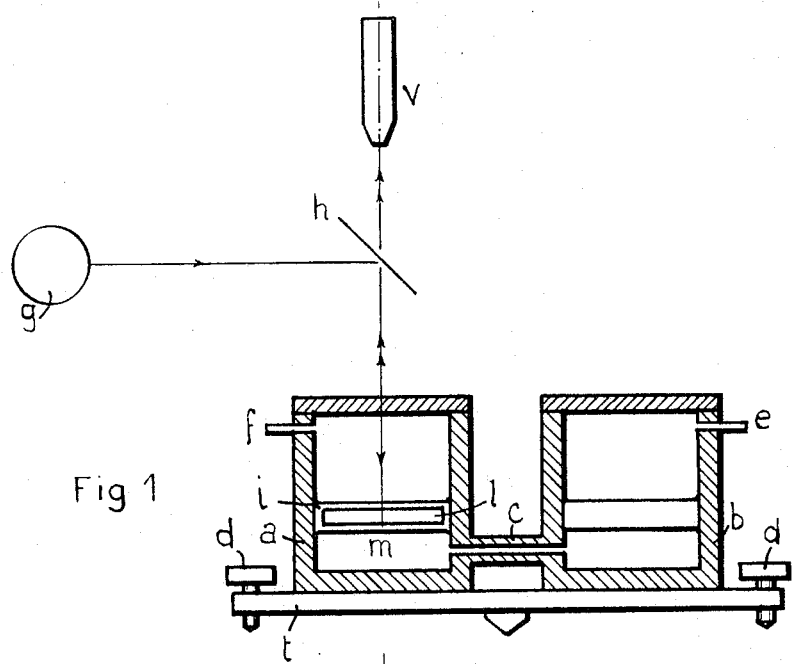
FIG. 1 is a simplified view in vertical section of an interferometric pressure gauge according to the invention and associated optical apparatus shown schematically.
Figure 2:
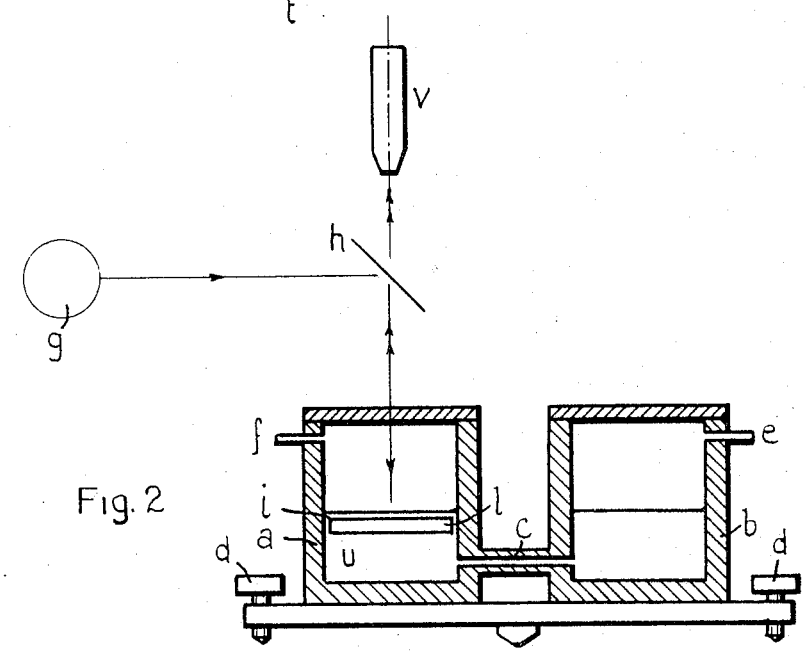
FIG. 2 is a similar showing of a modified form of the invention.
Figure 3:
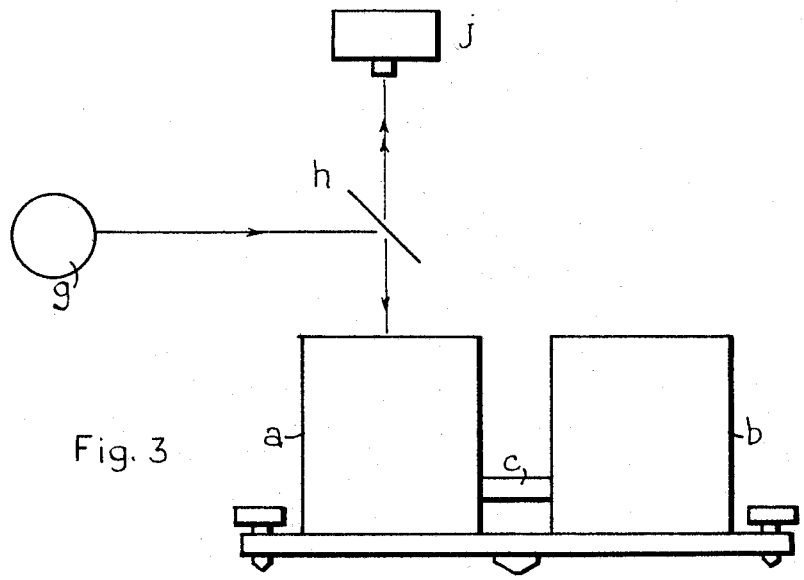
Figure 4:
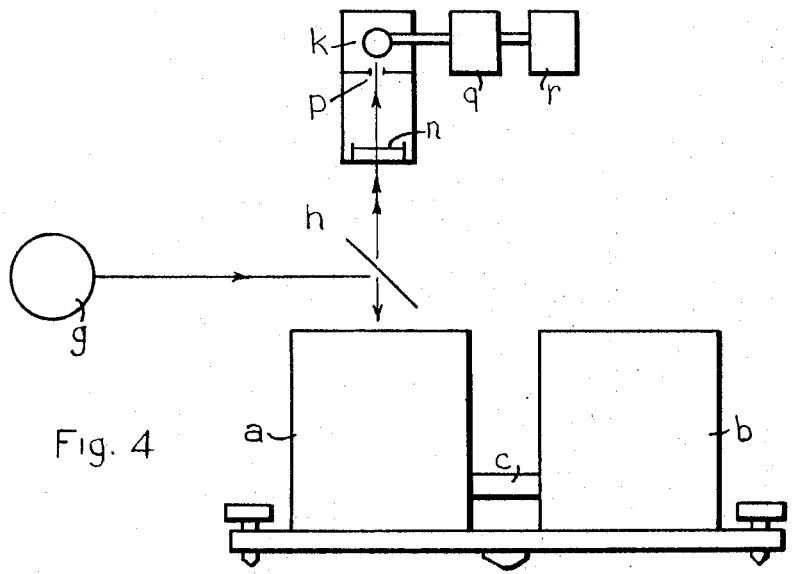

FIG. 3 similarly illustrates apparatus according to the invention wherein a photographic recording device replaces the optical viewer shown in FIGS. 1 and 2; and FIG. 4 illustrates another modified set-up using photoelectric means for the measurement of fringe displacement.

The device shown in FIG. 1 comprises a flat baseplate $t$ provided with vertical set screws $d$ whereby the inclination of the baseplate relative to a horizontal surface can be finely adjusted for purposes later to appear. Secured on the baseplate $t$ is a container assembly comprising a pair of small tanks $a$ and $b$, which may have any desired shape in horizontal cross section, such as round or square. The tanks $a$ and $b$ may be made of glass or other suitable material, and are interconnected near their base by means of a generally horizontal connecting tube $c$. The tanks $a$ and $b$ are provided with sealing covers as shown, with at least the cover sealing tank $a$ being transparent for reasons that will presently appear. Tubes $e$ and $f$ connecting with side walls of the respective tanks near the top thereof are adapted for connection through means not shown with sources of different pressures the difference between which is to be indicated by means of the instrument.

In one of the tanks, take $a$, there is mounted a flat strip 1 of transparent material, which is supported through means not shown in detail from the sides of the tank so as to be generally parallel to the plane of the baseplate $t$. There is free pressure communication across the strip 1 in the interior of tank $a$, it being understood that for this purpose the means attaching the strip 1 to the sides of the tank may be such as to provide an airgap around the marginal edges of the strip, between said edges and the inner wall surfaces of tank $a$. The under surface of strip 1 is made semireflective by suitable conventional means.

A reflective liquid such as mercury is introduced into the container assembly so as partly to fill both tanks $a$ and $b$ up to a level slightly below the under surface of the strip 1 positioned in tank $a$. Preferably, a small amount of damping liquid, such as a transparent silicone oil, is placed over the mercury surface in tank $a$, as indicated at $i$, in order to fill the gap between the mercury and the under surface of strip 1 and preferably surround the strip surfaces with a film of liquid, thereby to damp out rapid fluctuations in the level of the mercury.

A suitable light source $g$, such as a glow lamp, is arranged to direct a beam of light which is reflected down through the top cover of tank $a$ as shown by means of a suitable semi-reflective mirror $h$ positioned at 45° to the vertical above the tank. An optical viewer $v$ is positioned above the mirror $h$ and is preferably provided with a suitable micrometrically adjustable eyepiece not shown.

The device operates as follows. With the pressures applied at the inlet tubes $e$ and $f$ being the same, the inclination of the baseplate $t$ is adjusted using the set screws $d$ so that the free surface of the mercury within the tanks forms a very small angle with respect to the under surface of plate 1, as indicated by the fact that clearcut colour fringes become visible through viewer $v$ due to the well-known "Newton-ring" interference fringe effect resulting from the varying width or thickness dimension of the gap present between the free mercury surface in tank $a$ and the semi-reflective undersurface of strip 1 in said tank. If now the pressure inlets $e$ and $f$ are connected to slightly different pressure sources, the mercury level in the two tanks changes slightly, with the level rising in one tank and falling correspondingly in the other, depending on which pressure source is the higher of the two. The resulting variation in the mean thickness of the gap defined between the free mercury surface in tank $a$ and the under face of strip 1, causes a bodily shift of the fringes as seen through viewer $v$ in one or the other direction and by an amount corresponding to the pressure difference.

A monochromatic filter of suitable wavelength is preferably interposed ahead of the glow lamp $g$ so as to isolate a spectral line of suitable predetermined wavelength. The instrument may be easily calibrated prior to an actual measurement as follows. With the pressure at inlets $e$ and $f$ being equal, the micrometer viewer V is operated to measure the number N of micrometer calibrations corresponding to the distance between adjacent fringes. The pressure differential $P_1$ corresponding to a bodily shift of the set of fringes equal to one micrometer calibration is then given by the formula:

$$P_1 = 9810 \frac{d\lambda}{2nN}\left(1 + \frac{S_a}{S_b}\right) \quad (1)$$

where $d$ is the specific gravity of mercury, $n$ the refractive index of the transparent damping liquid $i$, $\lambda$ is the wavelength, and $S_a$ and $S_b$ are the horizontal cross sectional areas of tanks $a$ and $b$ respectively.

After the tubes $e$ and $f$ have been connected to the respective pressure sources for a pressure differential measurement, the number of micrometer divisions by which the set of fringes is observed to have shifted bodily is counted, and if N' is the counted number, then the desired pressure difference is given by the equation:

$$P = N'P_1 \qquad (2)$$

It will be noted that while the tanks $a$ and $b$ have been shown equal in transverse dimensions, this is by no means essential and it may in fact in many cases be advantageous to make the dimensions $S_a$ and $S_b$ in Equation 1 different and select these dimensions as dictated by the range of pressures to be measured with the particular instrument.

From Equation 1 it will be apparent that the sensitivity of the instrument would be increased by a reduction in the density $d$ of the liquid. This can be done by replacing the mercury heretofore considered by a liquid of lower specific gravity. In one desirable embodiment of the invention, the liquid is selected so as to possess transparent rather than reflective optical characteristics, such as a silicone oil of specific gravity about 1.07. In such case the instrument set-up would be somewhat modified as illustrated in FIG. 2, in which parts corresponding to parts in FIG. 1 have been similarly designated. The only difference in this case is that the container assembly $a$–$b$ is filled with a liquid $u$ having the transparent character just stated, up to a level just slightly higher than that of the upper surface of the plate 1, the upper surface of which may be reflective. Thus a thin film of the liquid $u$ is present above said upper surface as shown, and fringes are observed by transparency in this film in a manner otherwise exactly similar to that described with reference to FIG. 1. The damping liquid $i$ can in this case be omitted.

In the modified set up shown in FIG. 3, a photographic recording camera $j$ is substituted for the optical viewer $v$ previously referred to. Means may be provided for displacing the sensitive film surface of the camera device in a direction parallel to the direction of the fringes. After exposure and development of the film, the fringe displacement can be easily measured on the film. This procedure is especially suitable for the measurement of relatively large fringe shifts and permits measurement of relatively high pressure variations and pressure differences with high absolute precision.

A further method of exploiting the fringe shift data derived from the instrument is illustrated in FIG. 4. A photoelectric cell $k$ is positioned in a casing having a diaphragm $p$ and an optical system $n$ therein so as to allow the light from a single fringe at a time to impinge on the cell. The electrical output of cell $k$ is connected by way of an amplifier and pulse former $q$ to a pulse counter device $r$. As the fringes are shifted, the passing of each fringe causes an electric output pulse from cell $k$, and the pulse, after amplification in $q$, operates the pulse counter $r$. The resulting count is a measure of the pressure variation. The pulse counter $r$ may be replaced or supplementary by a suitable pulse recorder device. Such a setup is capable of easily yielding a precision of the order of one-tenth of a fringe and hence an extremely high absolute accuracy in the recording of extremely small pressure fluctuations as a function of time or some other variable.

It will thus be apparent that the invention has provided apparatus for the measurement of extremely small pressure variations and pressure differences. Absolute pressure differences of the order of only a few pascals (Newton/square meter) can be measured with a precision of the order of 0.01 pascal, and higher pressure differences can be measured with a relative accuracy of at least one-thousandth. The measurements are highly reproducible, and the apparatus is easily manipulated for calibration and adjusting purposes. In many cases the distinctive colouring of the fringes observed provides a reliable and quick method of identifying a pressure reading after calibration.

It will be evident that many modifications other than those illustrated and described may be introduced within the scope of the invention. Silicone oils of density about 1.07 have been found especially convenient for use as the damping liquid $i$ in conjunction with a reflective liquid such as mercury in the embodiment of FIG. 1, and as the transparent liquid $u$ in the embodiment of FIG. 2. An additional advantage of such silicone oils is their very low vapour tension, whereby differences between absolute pressures of extremely low value can be effectively measured. However, other liquids having suitable physical and optical properties may be used.

The container assembly of the differential pressure gauge device of the invention may be constructed in many ways other than that shown. Said assembly is not necessarily in the form of two tanks interconnected by a tube, as here shown and as used in the preferred forms of the invention. A single tank or container, provided with a suitable pressure takeoff at a point spaced from the free surface of the liquid, can be used. Instead of providing for the angular adjustment of the entire container assembly by means of the screws $d$ as here shown, means may be provided for adjusting the inclination of the strip 1 relative to the tank assembly instead. Various other modifications will occur to those familiar with the arts involved.

I claim:
1. A differential pressure indicating device comprising a base; a pair of tanks on the base; means interconnecting the tanks near the bottom thereof; means for applying different pressures to the respective tanks near the top thereof; a body of liquid partly filling both tanks; a strip secured across one of said tanks having a surface located just below the surface of said liquid and slightly inclined with respect thereto to define a thin film of variable thickness with respect to the surface of the liquid; means creating a set of interference fringes in said thin film; and means indicating a shift in said fringes as a measure of the variation in one of said pressures.

2. A device according to claim 1, wherein said inclination imparting means comprises screw means associated with said base.

3. A device as claimed in claim 1 wherein said liquid is a silicone oil.

4. A pressure indicating device comprising a container for a body of liquid, a liquid partially filling said container, an element within said container having a flat surface just below the surface of said liquid and slightly inclined with respect thereto to form a thin film of variable thickness with the surface of said liquid; adjustable means for imparting said slight inclination to said element surface relative to the horizontal plane; means creating a set of Newton fringes in said thin film; means communicating a variable pressure to the free surface of the liquid in the container whereby to vary the thickness of said thin film and produce a shift in said fringes; and means for indicating the amount of said shift as a measure of the variation in said pressure.

5. A device as claimed in claim 4 wherein said liquid is a silicone oil.

6. A differential pressure-indicating device comprising a container for a body of a reflective liquid, a strip of transparent material in the container having an under surface spaced above the upper surface of said liquid so as to define a gap of variable thickness between said under surface of the strip and said upper surface of the liquid, a small amount of a transparent damping liquid filling said gap, means creating a set of Newton fringes in said gap, means communicating a variable pressure to the free surface of the liquid in the container whereby to vary the thickness of said gap and produce a shift in said fringes, and means for indicating the amount of said shift as a measure of the variation in said pressure.

7. A device according to claim 6, including means for imparting a slight adjustable inclination to said strip relative to the free surface of the liquid.

8. A device according to claim 6, which comprises a base, a pair of tanks on the base and means interconnecting the tanks near the bottom thereof to constitute said container, said strip being positioned in one of said tanks, and adjusting screw means for imparting a slight adjustable inclination to said base and said pair of containers thereon relative to the horizontal plane, whereby to create a set of Newton fringes localized in said gap.

9. A device as claimed in claim 6 wherein said transparent damping liquid is a silicone oil.

References Cited by the Examiner
UNITED STATES PATENTS

| | | | |
|---|---|---|---|
| 2,434,029 | 1/1948 | Williams | 88—14 |
| 2,701,961 | 2/1955 | Svensson | 73—401 X |
| 2,817,238 | 12/1957 | Soehngen | 73—401 |
| 3,011,346 | 12/1961 | Garvin | 73—382 |

LOUIS R. PRINCE, *Primary Examiner.*

D. O. WOODIEL, *Assistant Examiner.*